(12) United States Patent
Sarkisian et al.

(10) Patent No.: US 6,735,963 B2
(45) Date of Patent: May 18, 2004

(54) AQUA-AMMONIA ABSORPTION SYSTEM WITH VARIABLE SPEED BURNER

(75) Inventors: Paul Sarkisian, Boulder City, NV (US); Lance Kirol, Morrisville, VT (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 10/125,125

(22) Filed: Apr. 16, 2002

(65) Prior Publication Data

US 2003/0192329 A1 Oct. 16, 2003

(51) Int. Cl.$^7$ ................................ F25B 15/00
(52) U.S. Cl. ................ 62/148; 62/101; 62/476
(58) Field of Search ............... 62/324.2, 476, 62/101, 483, 484, 486, 497, 112, 114, 148

(56) References Cited

U.S. PATENT DOCUMENTS

| | | | | |
|---|---|---|---|---|
| 2,850,266 A | * | 9/1958 | Merrick et al. ............. 165/265 |
| 4,322,951 A | * | 4/1982 | Alfano ........................ 62/101 |
| 4,429,541 A | * | 2/1984 | Kamejima et al. ............ 62/201 |
| 4,596,122 A | | 6/1986 | Kantner ....................... 62/141 |
| 4,718,243 A | | 1/1988 | Buschulte et al. ............. 62/101 |
| 5,138,846 A | | 11/1997 | Ogawa et al. ................ 62/148 |
| 5,682,755 A | | 11/1997 | Uchida et al. ................ 62/148 |
| 5,799,502 A | | 9/1998 | Nomura et al. ............... 62/476 |
| 6,332,328 B1 | | 12/2001 | Bangheri ..................... 62/148 |

FOREIGN PATENT DOCUMENTS

| | | |
|---|---|---|
| DE | 3344421 A1 | 6/1985 |
| DE | 3609306 A | 10/1986 |

* cited by examiner

*Primary Examiner*—Melvin Jones
(74) *Attorney, Agent, or Firm*—Knobbe, Martens, Olson & Bear, LLP

(57) ABSTRACT

An aqua-ammonia absorption cooling and/or heating system having a variable speed burner which uses active flow control of weak liquor and/or active control of refrigerant flow to the evaporator.

34 Claims, 4 Drawing Sheets

Valve plug drilled with small orifice when closed and larger orifice when open.

Valve plug drilled with fixed restriction when closed and minimal restriction when open.

Two-speed with parallel restrictions

Two-speed with series restrictions

Two-speed with parallel restrictions and two valves

Three-speed, expandable to any number of speeds.

AQUA-AMMONIA ABSORPTION SYSTEM WITH VARIABLE SPEED BURNER

BACKGROUND OF THE INVENTION

This invention relates to aqua-ammonia absorption cooling and/or heating systems utilizing ammonia refrigerant and aqueous absorbents. Improvements in the efficiencies of such systems include the use of generator/absorber heat exchange cycles utilizing rich and weak absorption working fluids and/or by separate heat exchange loops referred to as GAX cycles. Descriptions of such systems are found in U.S. Pat. Nos. 4,311,019, 5,024,063, 5,271,235, 5,367,884, Re. 36,684 and R. J. Modahl and F. C. Hayes, "Evaluation of Commercial Advanced Absorption Heat Pump Bread Board," The Trane Company, pp. 117–125, 1988. Additional improvements are described in co-pending U.S. patent application Ser. Nos. 479,277, filed Jan, 5, 2000 (ROCKYR.099A); 632,037, filed Aug. 3, 2000 (ROCKYR.105A); 632,054, filed Aug. 3, 2000 (ROCKYR.106A); and 709,875, filed Nov. 10, 2000 (ROCKYR.103A). The description of the aforesaid patents and applications are incorporated herein by reference.

Most operating hours during which the aforesaid systems are used typically occur at ambient temperatures where the load is less than the design building load, and less than the design capacity of the system or appliance. The aforesaid aqua-ammonia absorption systems or appliances incorporate single-speed burners or burners having a single firing rate. The usual means for providing heating and/or cooling at part load conditions is to cycle the appliance on and off. However, such systems experience cycle losses which decrease efficiency when they are so operated. Also, startup delays reduce desired heating or cooling response times with resulting inconsistent or non-uniform temperature controls. Single speed operation also does not take full advantage of the ability of the system to operate more efficiently at lower ambient temperatures, and takes no advantage of the capability of a system to operate more efficiently at part load.

SUMMARY OF THE INVENTION

As described herein, an aqua-ammonia absorption cooling and/or heating system incorporates a variable speed or multiple speed bumer, a burner having a continuously variable burner speed or firing rate, or a burner having a plurality of discrete burner speeds or firing rates. The terms burner speed and firing rates variable speed, multiple speed, and variable firing rate are used interchangeably herein as are the terms and, unless otherwise indicated variable or multiple speed, cover either continuous or discrete burner speeds or firing rates.

In one embodiment, a variable speed burner is used in combination with active control of weak liquor flow from the generator to the absorber assembly. Weak liquor flow is controlled in response to temperature, and/or pressure and/or concentration of the weak liquor. In another embodiment, weak liquor flow is actively controlled in discrete steps in response to burner speed.

In another embodiment, in an aqua-ammonia heating and/or cooling system, a variable speed burner is used in combination with active control of the flow of rerigerant to the system evaporator.

In another embodiment, a variable speed burner is used in combination with both active control of weak liquor flow and active refrigerant flow control.

Detailed Description of the Preferred Embodiments

Figure 1:
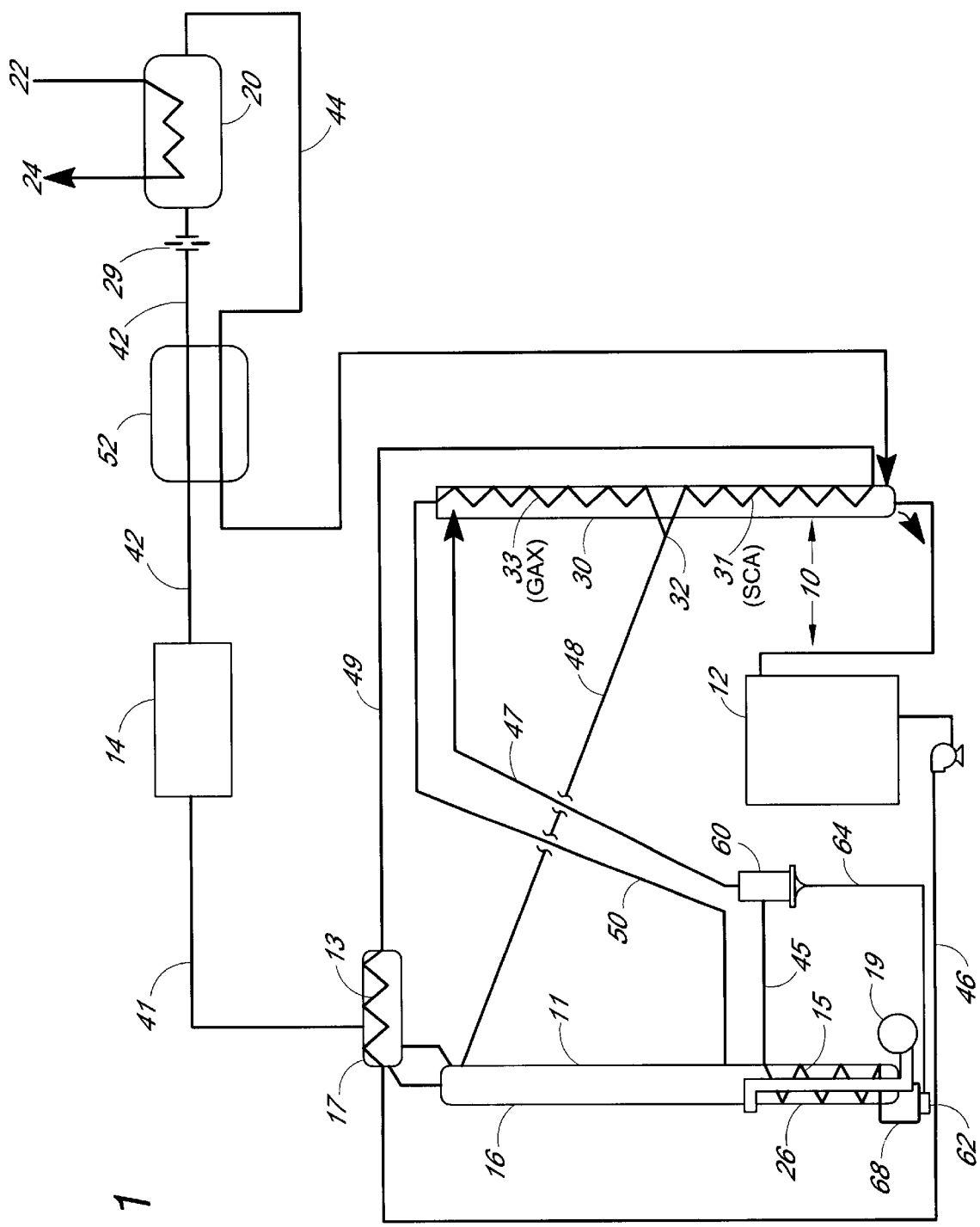
FIG. 1 is a schematic illustration of an aqua-ammonia absorption cooling system with a variable speed burner and having a temperature controlled valve and temperature-sensing bulb for controlling weak liquor flow.

The aqua-ammonia absorption apparatus described herein may perform cooling and/or heating functions. Such systems comprise an absorber assembly, a generator assembly, an absorption fluid loop for directing absorption fluid between the absorber and generator assemblies, a condenser, an evaporator, and a refrigerant loop including piping for directing refrigerant from the generator assembly to the condenser and the evaporator. The apparatus include chillers, heat pumps, refrigeration equipment, chiller-heaters, heating-only appliances, and dual-temperature appliances. The latter are a special type of heat pump that is not reversed, and in which both heating and cooling are produced simultaneously for beneficial use. Such apparatus includes conventional aqua-ammonia systems as well as high-efficiency GAX apparatus, disclosed in the aforesaid patents and applications FIG. 1 schematically illustrates an embodiment of an aqua-ammonia generator absorber heat-exchange (GAX) chiller system. The major components of the chiller system include an absorber assembly 10 comprising an absorber 12 and an absorber heat exchange section 30 which includes an absorber heat exchanger 31, sometimes referred to as a solution cooled absorber (SCA), and a GAX heat exchanger 33. The generator assembly 11 shown includes a generator heat exchanger 15, a boiler 26 having a variable speed burner 19 for heating and vaporizing the solution, an adiabatic section 16, and a rectifier section 17. The burner may include a combustion air pre-heater. A condenser 14 and an evaporator 20 are the other major components of the system. The chiller system may also include a subcooler 52 for precooling refrigerant from the condenser with cold gaseous refrigerant from the evaporator. A restriction device 29 such as an expansion valve orifice or capillary tube is shown along the refrigerant pipe 42 between the subcooler and the evaporator. The absorber and condenser heat exchangers may be air or liquid cooled, and the rectifier 17 may be cooled by solution, water or air. Such a GAX chiller is well-known in the art, for example, U.S. Pat. Nos. 5,490,393 and 5,367,884, and in the aforesaid Modahl et al. publication, the descriptions of which are incorporated herein by reference.

In the embodiment illustrated in FIG. 1, a temperature controlled valve 60 is used for controlling the flow of weak liquor from the generator to the absorber. The valve 60 is controlled by a temperature-sensing bulb 62 charged with a composition that produces pressure responsive to the temperature sensed by the bulb. The temperature-sensing bulb is installed in thermal contact with the weak liquor pick-up tube 68. Alternatively, the bulb may be placed in thermal contact with the bottom of the generator, either on the outside of the shell where it indirectly measures solution temperature at the bottom of the generator, or in direct thermal contact with solution inside the bottom of the generator. The temperature-sensing bulb may be installed at any desirable location, preferably where the ammonia-weak solution is at or near its bubble-point temperature. The bulb pressure, e.g., changes in the pressure of the composition, are directed to a moveable member such as diaphragm or bellows in the valve 60 resulting in opening and closing the valve in response to the pressure changes, or pressure differential between surfaces of the diaphragm. In the apparatus shown in FIG. 1, valve 60 is positioned between pipes 45 and 47 which direct the weak liquor from the bottom of generator 11 to the absorber assembly 10.

The aforesaid valve and its operation for controlling weak liquor flow in the system illustrated are further disclosed in U.S. patent application Ser. No. 10/252,298 filed Apr. 16. 2002. Other types of valves may be substituted for the diaphragm-operated valve described above. Any valve and controller that responds to weak liquor temperature and pressure so as to maintain constant or near constant weak liquor concentration may be used. Another alternative is to use a valve responding directly to weak liquor concentration or to some physical property correlated to weak liquor concentration. Electronic valves operated in response to weak liquor temperature, pressure and/or concentration, or fluid properties such as refractive index or conductivity could also be used. For example, such electronic valves may be continuously variable valves, or open-closed valves operated in a pulsed fashion, with pulse-width modulation or similar control algorithm to control the amount of the time the valve is open. A pulse-width operation controlled valve may respond to generator temperature, pressure or other physical properties correlated to weak solution concentration, or could be set to provide two or more different flow rates in response to operating conditions of the absorption system.

During the operation of the illustrated GAX chiller apparatus, the relatively cool refrigerant-rich absorption fluid solution is pumped from the absorber via pipe 46 to heat exchange coil 13 within rectifier 17 after which it is directed via pipe 49 to the absorber heat exchanger 31 and GAX heat exchanger 33. In the embodiment shown, a flow splitter 32 splits the ammonia-rich absorption fluid (rich liquor) passing from absorber heat exchanger (SCA) 31, a first portion to the generator via pipe 48 and a second portion to GAX heat exchanger 33 and then to the generator via pipe 50. The refrigerant vapor from evaporator 20 is directed via pipe 44 to the absorber assembly 10. Weak absorption fluid solution or weak liquor is directed to the absorber assembly 10 from the generator via pipe 45, valve 60, and pipe 47. As the weak solution from the generator passes over the GAX heat exchanger 33 inside the absorber and over the absorber heat exchanger 31, it absorbs ammonia vapor. The advantages of a GAX system with flow split of a portion of the rich absorption fluid through the GAX heat exchanger are discussed in more detail in the aforesaid references, particularly in the Modahl et al. publication and the '884 patent. However, within the broad class of GAX systems, the present invention is not to be limited by the method of recovering GAX heat, whether it is by strong liquor, weak liquor, or a secondary fluid. Further, of strong liquor GAX recovery systems, the present invention is not to be limited by location of the flow split of rich liquor into GAX and non-GAX streams. For example, in the FIGS. 2 and 3 embodiments, the rich liquor is split at flow splitter 32' after rectifier coil 13, with a portion passing to the generator via pipe 48' and a portion directed to the absorber heat exchanger 31. The present invention is not limited to GAX system and may be used in a conventional absorber heat exchange system, although the more efficient GAX cycle is preferred.

Figure 2:
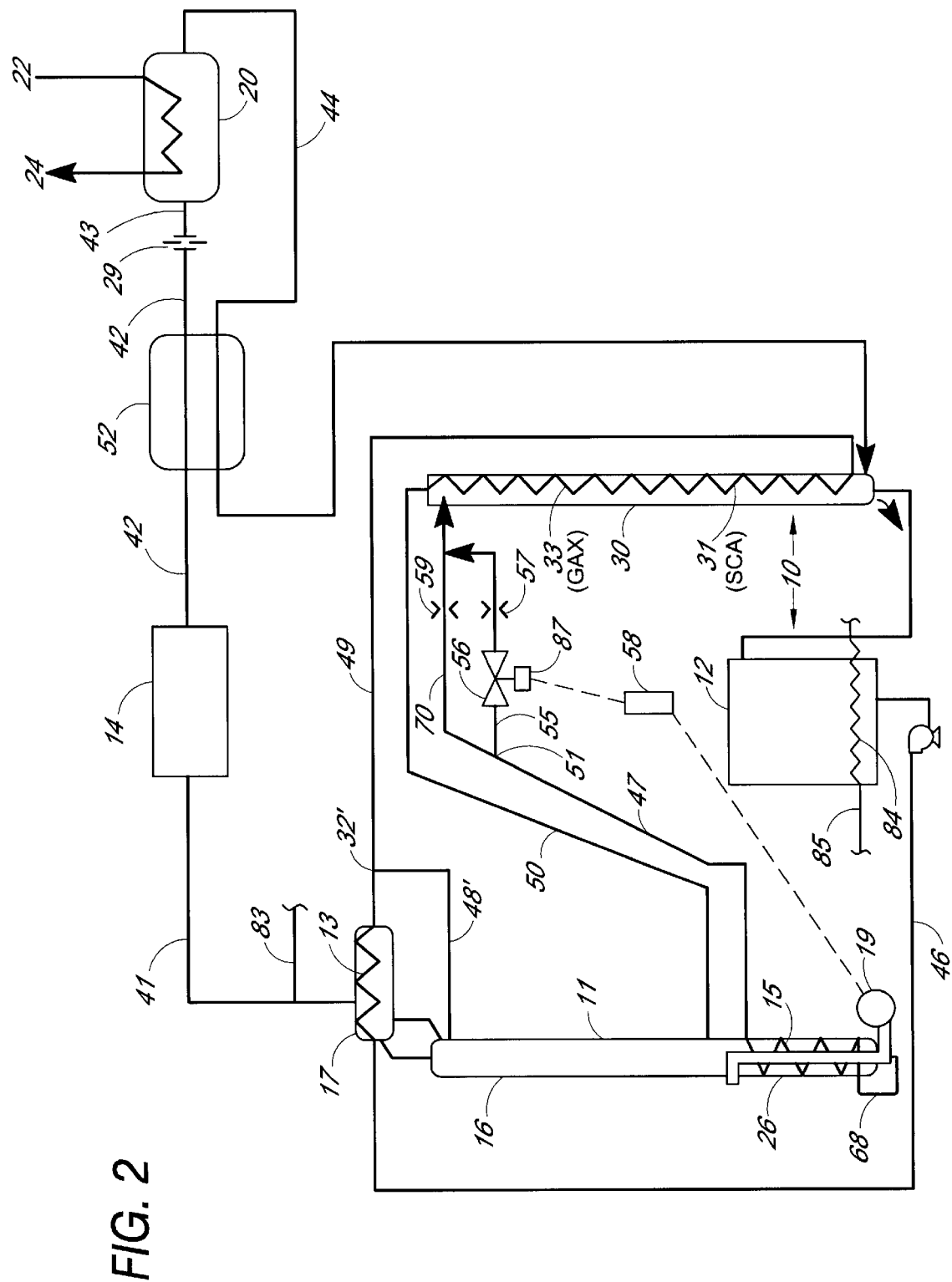
FIG. 2 is a schematic illustration of an aqua-ammonia absorption system with variable speed burner and having discrete weak liquor flow control in response to burner speed.

FIG. 2 schematically illustrates another embodiment of an aqua-ammonia chiller utilizing active weak liquor flow control cooperating with or in response to burner speed. In this embodiment, weak liquor flow may be changed in discrete steps. In the embodiment illustrated in FIG. 2, the weak liquor flow from generator assembly 11 to absorber assembly 10 is directed along pipe 47 to splitter 51 and therefrom to first and second piping 55 and 70, respectively. First piping 55 includes an actively controlled valve 56 and first restrictor 57. Second piping 70 includes a second restrictor 59. These two weak liquor flows provide high and low flow to accommodate weak solution concentrations within desired concentration ranges. For a high weak liquor flow, valve 56 is opened and weak liquor flowing from the generator to the absorber via pipe 49 splits at flow splitter 51, with a first portion passing through pipe 55, valve 56 and restriction 57, and a second portion passing through pipe 70 and restriction 59. In a low-flow mode, valve 56 is closed and all weak liquor flowing to the absorber passes through pipe 70 and restriction 59. Restrictions 57 and 59 may be any combination of orifices, capillary tubes, nozzles, or other fluid flow resistance elements known to those skilled in the art. Flow switching may be accomplished in response to changing operating or load conditions or weak solution concentrations so as to maintain desired concentration range. Reduced weak liquor flow rates may also be used to enhance absorption system startup. Increased weak liquor flow may be used to achieve shortterm increases in cooling capacity. The system may include a control device operatively communicating with or directly or indirectly connected to one or more flow control valves as well as one or more sensors for monitoring system conditions or parameters. For example, a controller and/or microprocessor may be operatively connected to a valve and/or sensing devices. As shown a controller 58 operatively communicates with multiple or variable speed burner 19 and valve control device 87 which operates to open and close valve 56. Such control can be based on load conditions, for example, chilled water, water temperature(s), e.g., supply or return. High weak liquor flow is advantageously used for high burner speed while low weak liquor flow is used for lower reduced burner speed. Valve control may be variable, especially suitable for use with a continuously variable speed burner. The controller may be thermostatically operated for controlling burner speed and valve opening whereby generator heating and weak liquor flow are changed in response to temperature conditions for which the heating and/or cooling system is used. The controller may include software or a microprocessor for changing the firing speed of burner 19 in response to changes in ambient temperatures, or other load conditions monitored by the controller or other monitoring devices. The controller, in response to such conditions or changes, operates valve 56. Discrete weak solution flow control as shown in FIG. 2 is most advantageous with a burner having discrete changes in firing rate. Where the burner is of a continuous variable firing type, continuous control of weak solution flow is preferred. Continuous control of weak solution flow can be achieved with a mechanical valve as shown in FIG. 1, or electronic valves, these being either modulating valves or open-closed valves controlled via pulse-width modulation. By way of example, controller 58 may incorporate pulse-width modulation control algorithm software or firmware for controlling operation of valve 56 and cycling the valve to rapidly open and close, and the controller or microprocessor configured to operate using pulse-width modulation in response to changes in temperature, pressure, concentrations, etc.

In the aqua-ammonia systems, the absorber 12 may be air cooled as illustrated in FIG. 1 or may be cooled by refrigerant such as described in U.S. Patent Re. 36,684, the description of which is incorporated herein by reference. For such absorber cooling, FIG. 2 illustrates a portion of a refrigerant loop comprising a heat exchanger coil 84 in which condensed refrigerant supplied from condenser 14 is at least partially vaporized for cooling the absorber. Where such an embodiment is used, the apparatus may include a reservoir for the condensed refrigerant. The refrigerant loop further includes piping 83 which communicates with piping 85 for directing the vaporized refrigerant from the absorber heat exchanger coil where it is combined with refrigerant vapor from the rectifier 17 to piping 41 to the condenser 14. In such an embodiment, by combining refrigerant vaporized in cooling the absorber with refrigerant vapor from the rectifier flowing to the condenser, all heat rejection is achieved at the condenser. The rectifier may also include a reflux coil for cooling the rectifier by heating and/or vaporizing refrigerant in the reflux coil or cooling coil. Such a refrigerant loop is also preferably used with valving such as one or more valves and more preferably a four-way valve for reversing refrigerant flow as disclosed in Re. 36,684. Such a valve-controlled refrigerant loop selectively directs the refrigerant to and from the condenser and the evaporator, each of which may alternately function to evaporate or condense refrigerant in a heat pump system. The above-described weak-liquor flow control as well as the absorber cooling and system heat rejection may be used in a dual-temperature appliance incorporating the aforesaid components and having a refrigerant loop in which refrigerant flow is not reversed and the condenser and evaporator heat exchange functions are not reversed.

Figure 3:
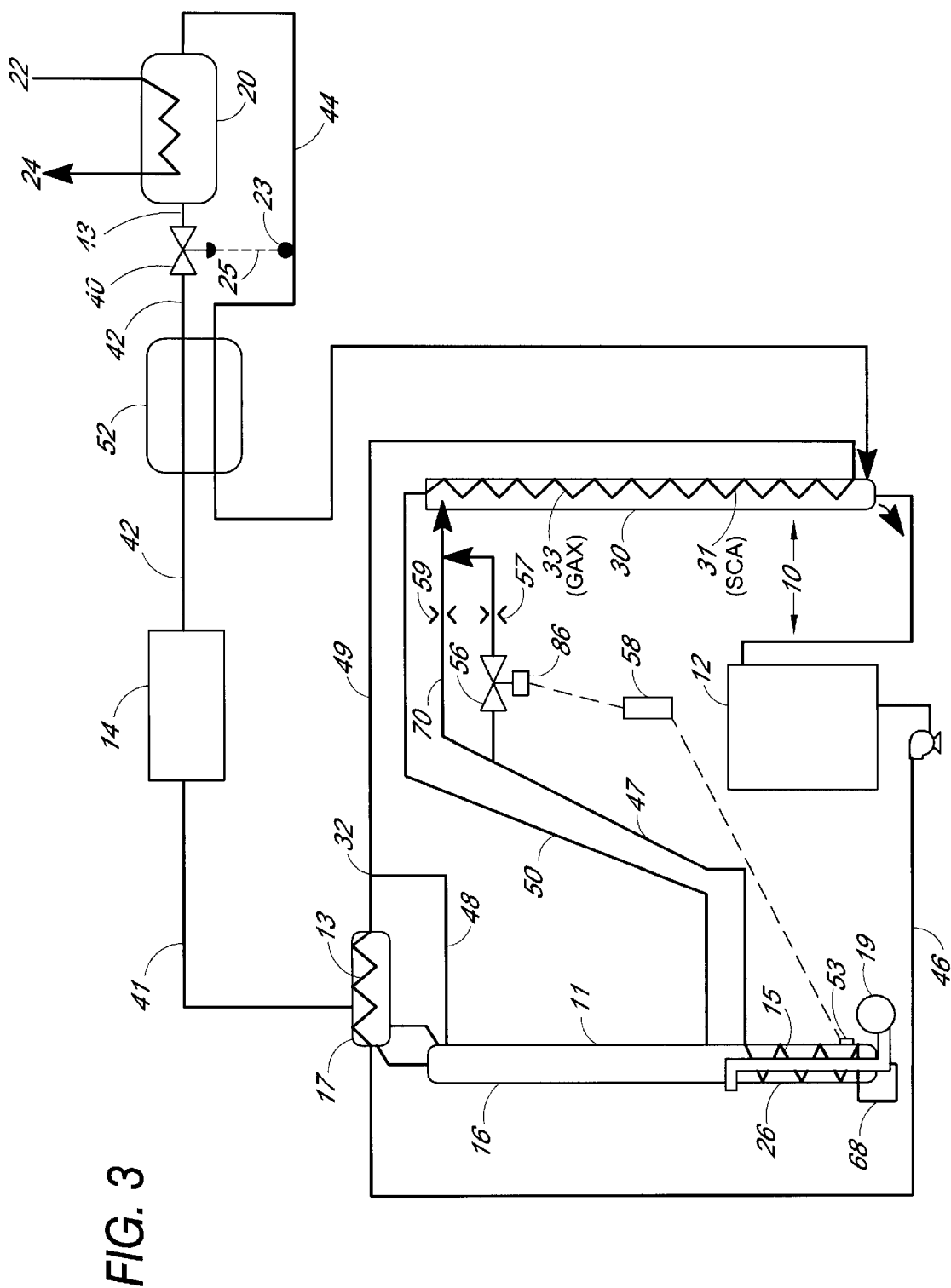
FIG. 3 is a schematic illustration of an aqua-ammonia absorption system with variable speed burner combined with discrete weak liquor flow control and a TXV for active control of refrigerant flow to the evaporator.

FIG. 3 illustrates another embodiment for controlling the flow rate of weak liquor. The generator assembly is heated by variable speed burner 19. Burner speed may be thermostatically controlled, or a controller and/or microprocessor programmed for operating the burners may be used. Valve 56 operated by valve control device 87 is responsive to a controller 58 operatively connected to temperature-sensing device 53 in thermal contact with the bottom of generator 11. Controller 58 operates valve 86 in response to the temperature sensed by device 53. The valve may be variably controlled or one which is opened or closed. Temperature-sensing device 53 may be placed within the generator in direct thermal contact with the solution inside the bottom of the generator rather than on the outside shell. The valve may be mechanical or electronic. Alternatively, a device for measuring some other physical property of the weak liquor, such as refrigerant concentration, may be substituted for temperature-sensing device 53 or used in combination with temperature sensing. Such a concentration detection, alone or combined with temperature sensing, is monitored by controller 58 for operating valve 56 to maintain desired weak liquor concentration supplied to the absorber.

Electronic control of the weak solution flow and/or the burner firing rate may be based on sensing of the building load or one or more parameters representing the load. For example, chilled water supply or return air temperature is one measure of the relative capacities of the chiller vs. the building load. Drop of temperature of the chilled water supply (or return) below a previously determined set point temperature is an indication that the chiller is operating at a greater capacity than is needed by the building load. In such a case, one or more of the weak solution control valve(s) would be closed or modulated more towards closing to reduce flow of weak solution, and in conjunction the burner would be modulated to reduce the firing rate. Conversely, if the chilled water supply (or return) temperature increases above a set point, one or more of the weak solution valves(s) would open or be modulated more towards opening to increase the flow of weak solution, and the burner would be modulated to increase the firing rate. Electronic control apparatus such as a controller or microprocessor such as described above operatively connected to one or more components which sense the building load and/or parameters such as described may be used.

FIG. 3 also illustrates another embodiment which combines both weak liquor flow control and refrigerant flow control in a variable speed fired aqua-ammonia absorption system. In FIG. 3, a valve and temperature-sensing bulb are used for controlling refrigerant flow to the evaporator and controlling vapor superheat. A TXV 40 is positioned along pipe 42 for controlling the flow of refrigerant to evaporator 20. A temperature-sensing bulb 23 is positioned at or near the evaporator or outlet on pipe 44, with a pressure conduit 25 communicating between the temperature-sensing bulb 23 and valve 40. A preferred bulb charge composition comprises a mixture of propane and butane and preferably between about 10% and about 40% butane and between about 90% and about 60% propane, by weight. A preferred valve used in the apparatus of the invention is a pulsed operation control valve disclosed in U.S. Pat. No. 5,675,982. The use and operation of the valve for controlling superheat in such an apparatus is described in more detail in copending application Ser. No. 10/125,297 file Apr. 16, 2002 and incorporated herein by reference.

Figure 4A:
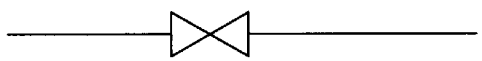
FIGS. 4a–f schematically illustrate different types of valving and flow restrictions for two-speed discrete weak liquor flow control and an example of three-speed flow control.
Figure 4B:
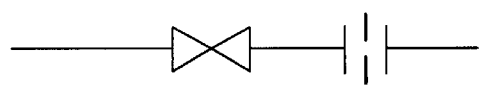
Figure 4C:
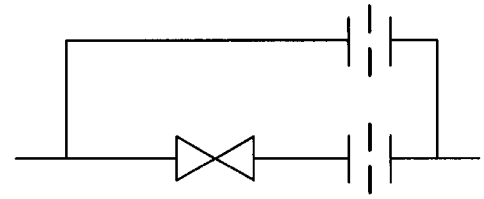
Figure 4D:
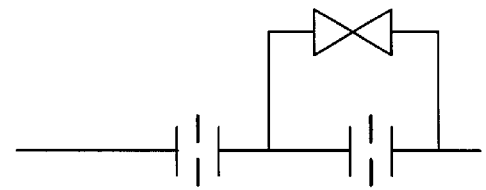
Figure 4E:
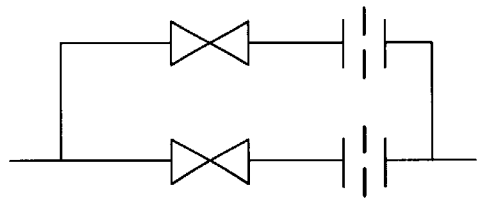
Figure 4F:
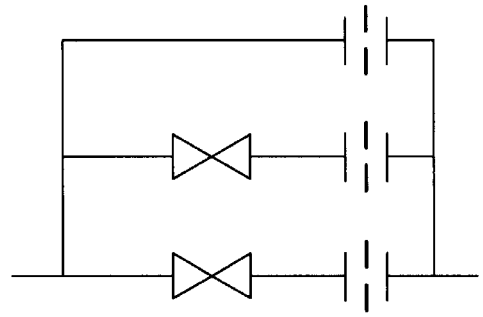

There are numerous ways of accomplishing switching of weak solution flow rates using valving, i.e., one or more valves, in combination with various fixed fluid flow resistance components. FIGS. 4a–f are illustrative of examples of different types of valving and flow restrictions which may be used. FIG. 4a illustrates the use of a valve that, when closed, still allows fluid flow, but with more flow resistance than when the valve is open. An example of such a valve is one in which a hole is drilled in the valve plug, whereby a small fluid flow passes through the small orifice drilled in the plug when the plug is seated, and when the plug is lifted from the valve seat, greater fluid flow passes through the larger restriction defined by the valve seat. Such a valve may be operated by a solenoid, or other type of control. FIG. 4b illustrates a similar drilled valve having a small and a large restriction when closed or opened, respectively, used in series with a restriction providing an additional flow resistance, which may be used either upstream or downstream of the valve. In FIG. 4c, a parallel resistance in a by-pass line is used in combination with a valve. The valve may be drilled as previously described, or it may be fully closed or opened. Again, the fixed resistance used in the same line with the valve may be upstream or downstream from the valve. Such an embodiment with parallel restrictions is like that illustrated in FIG. 3. FIG. 4d illustrates series of resistances with a single valve used to by-pass one resistance for high-flow. Again, the valve may be drilled for high and low flow, or have variable valve openings, either of which valves may be controlled. FIG. 4e shows parallel flow restrictions with a valve in series with each restriction. Such an embodiment may be preferred to the embodiment illustrated in FIG. 4c when it is desired to terminate weak solution flow completely, for example, for shutdown or other operational reasons. The above valve and restriction embodiments are useful for two weak liquor flow modes, high and low flow, and for two burner speed systems. FIG. 4f illustrates an example of valving and flow restrictions for a three-speed or three-step flow control. It will be understood that different combinations of valve and flow restrictions may be used, expandable to any desired number of weak liquor fluid flow controls. Any one or more of the valves may be operated for being fully opened or closed, such as a solenoid-operated valve, or may be controlled for variable opening.

What is claimed is:

1. An aqua-ammonia absorption cooling and/or heating apparatus comprising:

an absorber assembly, a generator assembly and a variable speed or multiple speed burner, a condenser, an evaporator, a refrigerant loop for directing refrigerant between said absorber assembly, generator assembly, condenser and evaporator, an absorption fluid loop for directing absorption fluid between said absorber assembly and said generator assembly, said absorption fluid loop including first piping for directing ammonia-rich absorption fluid from the absorber assembly to the generator assembly and second piping for directing ammonia-weak absorption fluid from the generator assembly to the absorber assembly, and one or more first valves cooperating with the second piping for controlling the flow rate of weak absorption fluid therein, and a control apparatus including sensing apparatus for sensing one or more load conditions and for controlling burner speed and for opening and/or closing the one or more first valves in response to one or more load conditions.

2. An apparatus of claim 1 wherein said condenser and evaporator comprise first and second heat exchangers, respectively, each capable of functioning as a condenser or an evaporator, said apparatus having one or more second valves cooperating with said refrigerant loop for selectively reversing the flow of refrigerant to and from the said heat exchangers.

3. An apparatus of claim 2 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

4. An apparatus of claim 3 including a rectifier and a cooling coil therein in fluid communication with said refrigerant loop whereby condensed refrigerant is directed to said cooling coil and is heated and/or at least partially vaporized therein to cool said rectifier, and wherein said refrigerant loop includes piping for directing heated and/or vaporized refrigerant from said cooling coil to said condenser.

5. An apparatus of claim 1, 2, 3 or 4 wherein said absorber assembly includes an absorber, an absorber heat exchanger and a generator/absorber heat exchanger and wherein said absorption fluid loop includes one or more conduits for directing ammonia-rich absorption fluid in the absorber assembly from the absorber to the absorber heat exchanger and the generator/absorber heat exchanger.

6. An apparatus of claim 5 wherein said second piping includes one or more flow restriction devices in series or in parallel with said one or more first valves.

7. An apparatus of claim 6 wherein said second piping includes a flow splitter and a plurality of conduits communicating therewith for directing ammonia-weak absorption fluid to a first valve and to a flow restriction device, respectively.

8. An apparatus of claim 1 including a temperature-sensing bulb in thermal contact with ammonia-weak absorption fluid in the generator assembly for opening and/or closing a first valve in response to the sensed temperature of the ammonia-weak absorption fluid, said one or more first valves comprising a valve having a movable member for controlling the opening and closing of said valve the movable member having a first side exposed to the bulb pressure and a second side exposed to generator pressure or pressure of the ammonia-weak absorption fluid from the generator, wherein said valve is opened and closed in response to pressure differential between the first and second side of the movable member.

9. An apparatus of claim 8 wherein said a first valve has a pressure port exposed to the temperature-sensing bulb pressure and wherein said first side of the movable member is exposed to said pressure port, an inlet port communicating with said generator and an outlet port communicating with said absorber.

10. An apparatus of claim 8 including a valve control component operatively connected to said temperature-sensing bulb.

11. An apparatus of claim 1 wherein said second piping includes a flow splitter and first and second conduits communicating therewith, and a first valve and/or a flow restriction device along said first and second conduits, and wherein said sensing apparatus is operatively connected to at least one of said first valves.

12. An apparatus of claim 1 including a controller having a controller function component for controlling operation of said one or more first valves, and wherein said sensing apparatus is operatively connected to said controller or controller function component.

13. An apparatus of claim 1 including electronic control apparatus operatively connected to said one or more first valves and one more components for sensing building load and/or one or more parameters thereof operatively connected to said electronic control apparatus for controlling the operation of said one or more first valves in response to load and/or one or more load parameters.

14. An apparatus of claim 13 wherein said one or more load parameters comprises chilled water or return temperature.

15. An apparatus of claim 1 wherein said refrigerant loop includes piping for directing refrigerant from the condenser to the evaporator, and a valve assembly cooperating with said refrigerant piping for controlling the flow of refrigerant therein, said valve assembly comprising a third valve having an inlet port communicating with said condenser, an outlet port communicating with said evaporator, and a temperature-sensing bulb in thermal contact with said evaporator at or near the evaporator outlet, said third valve including a pressure port exposed to the temperature-sensing bulb pressure and a movable member exposed to said pressure port and responsive to bulb pressure for operating said valve and for controlling flow therethrough in response to temperature sensed by the temperature-sensing bulb.

16. An apparatus of claim 15 wherein said movable member has a first side exposed to temperature-sensing bulb pressure and a second side exposed to evaporator pressure, whereby said movable member causes the third valve to operate in response to the pressure differential between the temperature-sensing bulb and the evaporator.

17. An apparatus of claim 15 wherein said valve assembly comprises a pulsed operation control valve comprising:

an inlet port in communication with said condenser having an inlet flow area for receiving condensed refrigerant, and a valve for opening and closing said inlet port;

an outlet port having an outlet flow area and communicating with said evaporator for directing liquid refrigerant thereto;

a valve cavity between said inlet port and said outlet port and in open communication therewith;

said pulsed operation control valve being responsive to pressure within said valve cavity for operating the valve and controlling the opening and closing of said inlet port, and wherein higher pressure therein biases said valve to close said inlet port and lower pressure therein biases valve to open said inlet port; and said inlet flow area being at least twice the size of said outlet flow area whereby opening said inlet port provides for rapid pressure buildup in said cavity and rapid closure thereof after each opening.

18. An apparatus of claim 15 wherein said temperature-sensing bulb comprises a bulb charge composition comprising between about 10% and about 40% butane and between about 90% and about 60% propane, by weight.

19. An apparatus of claim 15 wherein said temperature-sensing bulb comprises a bulb composition comprising an ammonia-water mixture having above 70% ammonia, by weight.

20. An apparatus of claim 19 wherein said mixture has between about 80% and about 90% ammonia, by weight.

21. An aqua-ammonia absorption cooling and/or heating apparatus comprising:

an absorber assembly, a generator assembly, a condenser, an evaporator, a refrigerant loop for directing refrigerant between said absorber assembly, generator assembly, condenser and evaporator, an absorption fluid loop for directing absorption fluid between said absorber assembly and said generator assembly, said absorption fluid loop including first piping for directing ammonia-rich absorption fluid from the absorber assembly to the generator assembly and second piping for directing ammonia-weak absorption fluid from the generator assembly to the absorber assembly, and a valve assembly comprising one or more flow control valves cooperating with the second piping for controlling the flow rate of weak absorption fluid therein, said apparatus including a variable speed or multiple speed burner for heating absorption fluid in said generator assembly, and a control device operatively communicating with said variable speed or multiple speed burner and said valve assembly for controlling said one or more flow control valves in response to or cooperating with the burner speed.

22. An apparatus of claim 21 wherein said second piping includes one or more flow restriction devices in series or in parallel with said one or more flow control valves.

23. An apparatus of claim 22 wherein said second piping includes a flow splitter and a plurality of conduits communicating therewith for directing ammonia-weak absorption fluid to a flow control valve and to a flow restriction device, respectively.

24. An apparatus of claim 22 wherein said second piping includes a flow splitter and first and second conduits in flow communication therewith, a flow restriction device cooperating with the first conduit and a flow control valve cooperating with the second conduit.

25. An apparatus of claim 24 including a flow restriction device cooperating with said second conduit.

26. An apparatus of claim 25 including a flow control valve cooperating with said first conduit.

27. An apparatus of claim 21 or 23 wherein said control device comprises electronic control apparatus and one or more components for sensing building load and/or one or more parameters thereof operatively communicating with said electronic control apparatus for controlling the operation of said one of more flow control valves and the burner speed in response to load and/or one or more load parameters.

28. An apparatus of claim 27 wherein said one or more load parameters comprises chilled water supply or return temperature.

29. An apparatus of claim 21 or 24 wherein said refrigerant loop includes piping for directing refrigerant from the condenser to the evaporator, and a valve assembly cooperating with said refrigerant piping for controlling the flow of refrigerant therein, said valve assembly comprising a refrigerant control valve having an inlet port communicating with said condenser, an outlet port communicating with said evaporator, and a temperature-sensing bulb in thermal contact with said evaporator at or near the evaporator outlet, said refrigerant control valve including a pressure port exposed to the temperature-sensing bulb pressure and a movable member exposed to said pressure port and responsive to bulb pressure for operating said valve and for controlling flow therethrough in response to temperature sensed by the temperature-sensing bulb.

30. An apparatus of claim 29 wherein said movable member has a first side exposed to temperature-sensing bulb pressure and a second side exposed to evaporator pressure, whereby said movable member causes the refrigerant control valve to operate in response to the pressure differential between the temperature-sensing bulb and the evaporator.

31. An apparatus of claim 30 wherein said refrigerant control valve assembly comprises a pulsed operation control valve comprising:

an inlet port in communication with said condenser having an inlet flow area for receiving condensed refrigerant, and a valve for opening and closing said inlet port;

an outlet port having an outlet flow area and communicating with said evaporator for directing liquid refrigerant thereto;

a valve cavity between said inlet port and said outlet port and in open communication therewith;

said valve being responsive to pressure within said valve cavity for operating the valve and controlling the opening and closing of said inlet port, and wherein higher pressure therein biases said valve to close said inlet port and lower pressure therein biases valve to open said inlet port; and said inlet flow area being at least twice the size of said outlet flow area whereby opening said inlet port provides for rapid pressure buildup in said cavity and rapid closure thereof after each opening.

32. An apparatus of claim 29 wherein said temperature-sensing bulb comprises a bulb charge composition comprising between about 10% and about 40% butane and between about 90% and about 60% propane, by weight.

33. An apparatus of claim 31 wherein said temperature-sensing bulb comprises a bulb charge composition comprising between about 10% and about 40% butane and between about 90% and about 60% propane, by weight.

34. An apparatus of claim 31 wherein said temperature-sensing bulb comprises a bulb composition comprising an ammonia-water mixture having above 70% ammonia, by weight.

* * * * *

UNITED STATES PATENT AND TRADEMARK OFFICE
CERTIFICATE OF CORRECTION

PATENT NO. : 6,735,963 B2
DATED : May 18, 2004
INVENTOR(S) : Sarkisian et al.

It is certified that error appears in the above-identified patent and that said Letters Patent is hereby corrected as shown below:

Column 1,
Line 17, delete "Jan,", and insert -- Jan. --.
Line 42, delete "bumer" and insert -- burner --.
Line 59, delete "rerigerant" and insert -- refrigerant --.

Column 2,
Line 33, after "applications" insert -- . --.

Column 3,
Line 8, after "as" insert -- a --.
Lines 17-18, delete "Apr. 16.2002" and insert -- Apr. 16, 2002 (ROCKYR.112A) --.
Line 18, after "2002" insert -- , the description of which is incorporated herein be reference --.

Column 6,
Line 31, after "5,675,982" insert -- , the description of which is incorported herein by reference --.
Line 34, after "2002" insert -- (ROCKYR.104A) --.

Column 7,
Line 29, after "and" delete "a".

Column 8,
Line 7, after "valve" insert -- , --.
Line 13, after "said" delete "a first".
Line 33, after "one" insert -- or --.

UNITED STATES PATENT AND TRADEMARK OFFICE
CERTIFICATE OF CORRECTION

PATENT NO. : 6,735,963 B2
DATED : May 18, 2004
INVENTOR(S) : Sarkisian et al.

It is certified that error appears in the above-identified patent and that said Letters Patent is hereby corrected as shown below:

Column 10,
Line 3, delete "one of more" and insert -- one or more --.

Signed and Sealed this

Eleventh Day of April, 2006

JON W. DUDAS
*Director of the United States Patent and Trademark Office*